(12) United States Patent
Seong

(10) Patent No.: US 9,806,304 B2
(45) Date of Patent: Oct. 31, 2017

(54) SECONDARY BATTERY

(71) Applicant: Samsung SDI Co., Ltd., Yongin-si, Gyeonggi-do (KR)

(72) Inventor: Jaeil Seong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 41 days.

(21) Appl. No.: 14/963,758

(22) Filed: Dec. 9, 2015

(65) Prior Publication Data

US 2016/0218330 A1    Jul. 28, 2016

(30) Foreign Application Priority Data

Jan. 28, 2015  (KR) .......................... 10-2015-0013527

(51) Int. Cl.
| | |
|---|---|
| H01M 2/08 | (2006.01) |
| H01M 2/04 | (2006.01) |
| H01M 2/06 | (2006.01) |
| H01M 10/42 | (2006.01) |
| H01M 2/30 | (2006.01) |
| H01M 2/02 | (2006.01) |

(52) U.S. Cl.
CPC ............ *H01M 2/08* (2013.01); *H01M 2/043* (2013.01); *H01M 2/0404* (2013.01); *H01M 2/06* (2013.01); *H01M 2/30* (2013.01); *H01M 10/4257* (2013.01); *H01M 2/0217* (2013.01); *H01M 2/0237* (2013.01)

(58) Field of Classification Search
None
See application file for complete search history.

(56) References Cited

U.S. PATENT DOCUMENTS

2011/0300414 A1* 12/2011 Baek .................. H01M 2/0426
                                                                    429/7
2012/0121936 A1*  5/2012 Baek .................... H01M 10/42
                                                                    429/7

FOREIGN PATENT DOCUMENTS

| JP | 2012-221911 A | 11/2012 |
|---|---|---|
| KR | 2006-0112743 A | 11/2006 |
| KR | 2007-0088894 A | 8/2007 |
| KR | 2011-0134259 A | 12/2011 |
| KR | 2014-0081105 A | 7/2014 |

* cited by examiner

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

Provided is a secondary battery, which can prevent a protective circuit board and an electrode terminal from colliding with each other by providing a gasket including a support unit protruding from a top surface of a cap plate to be higher than the electrode terminal. The secondary battery includes an electrode assembly, a case accommodating the electrode assembly, a cap plate coupled to an opening of the case, an electrode terminal electrically connected to the electrode assembly and upwardly protruding through a terminal throughhole of the cap plate, and a gasket interposed between the cap plate and the electrode terminal and electrically insulating the cap plate and the electrode terminal from each other. The gasket includes a support unit protruding from the cap plate to be higher than the electrode terminal.

15 Claims, 5 Drawing Sheets

SECONDARY BATTERY

RELATED APPLICATIONS

This application claims priority from Korean Patent Application No. 10-2015-0013527 filed on Jan. 28, 2015 in the Korean Intellectual Property Office, and all the benefits accruing therefrom under 35 U.S.C. 119, the contents of which in its entirety are herein incorporated by reference.

BACKGROUND

Field

The present invention relates to a secondary battery.

Description of the Related Art

In general, secondary batteries can be charged and discharged, unlike primary batteries which are not rechargeable. Low-capacity secondary batteries each having a single battery cell packaged in the form of a pack are widely employed in small sized portable electronic devices, such as smart phones, tablet computers, and digital cameras while large-capacity secondary batteries having several tens to several hundreds of battery cells connected to one another are typically used for driving motors of electric bicycles, electric scooters, electric automobiles or hybrid automobiles.

Secondary batteries are manufactured in various shapes, including, for example, prismatic type, cylindrical and pouch types. A secondary battery is formed by accommodating an electrode assembly including positive and negative electrodes and a separator interposed between the positive and negative electrodes in a case with an electrolyte and installing a cap plate in the case. Here, positive and negative electrode terminals are connected to the electrode assembly and are exposed and protruded to the outside through the cap plate.

SUMMARY OF CERTAIN INVENTIVE ASPECTS

The present invention provides a secondary battery, which can prevent a protective circuit board and an electrode terminal from colliding with each other by providing a gasket including a support unit protruding from a top surface of a cap plate to be higher than the electrode terminal.

The above and other objects of the present invention will be described in or be apparent from the following description of the preferred embodiments.

According to an aspect of the present invention, there is provided a secondary battery including an electrode assembly, a case accommodating the electrode assembly, a cap plate coupled to an opening of the case, an electrode terminal electrically connected to the electrode assembly and upwardly protruding through a terminal throughhole of the cap plate, and a gasket interposed between the cap plate and the electrode terminal and electrically insulating the cap plate and the electrode terminal from each other, wherein the gasket includes a support unit protruding from the cap plate to be higher than the electrode terminal.

The gasket may include an insertion unit inserted into the terminal throughhole, and a mounting unit extending on the insertion unit along a top surface of the cap plate and including a mounting groove in which the electrode terminal is mounted.

The support unit may extend from a region of the mounting unit along the top surface of the cap plate.

The support unit may protrude from the top surface of the cap plate to be higher than the mounting unit.

The support unit may have a thickness of 1.5 to 3 times a thickness of the mounting unit.

The electrode terminal may include a pillar part inserted into the terminal throughhole and a head part mounted in the mounting unit.

The head part may protrude from the top surface of the cap plate to be higher than the mounting unit.

The secondary battery may further include a protective circuit board mounted on the cap plate. Here, a bottom surface of the protective circuit board comes into contact with a top surface of the support unit.

The protective circuit board and the electrode terminal may be spaced apart from each other.

As described above, the secondary battery according to the present invention can prevent a protective circuit board and an electrode terminal from colliding with each other when an external shock is applied to the secondary battery by providing a gasket including a support unit protruding from a top surface of a cap plate to be higher than the electrode terminal.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF CERTAIN INVENTIVE EMBODIMENTS

Figure 1:
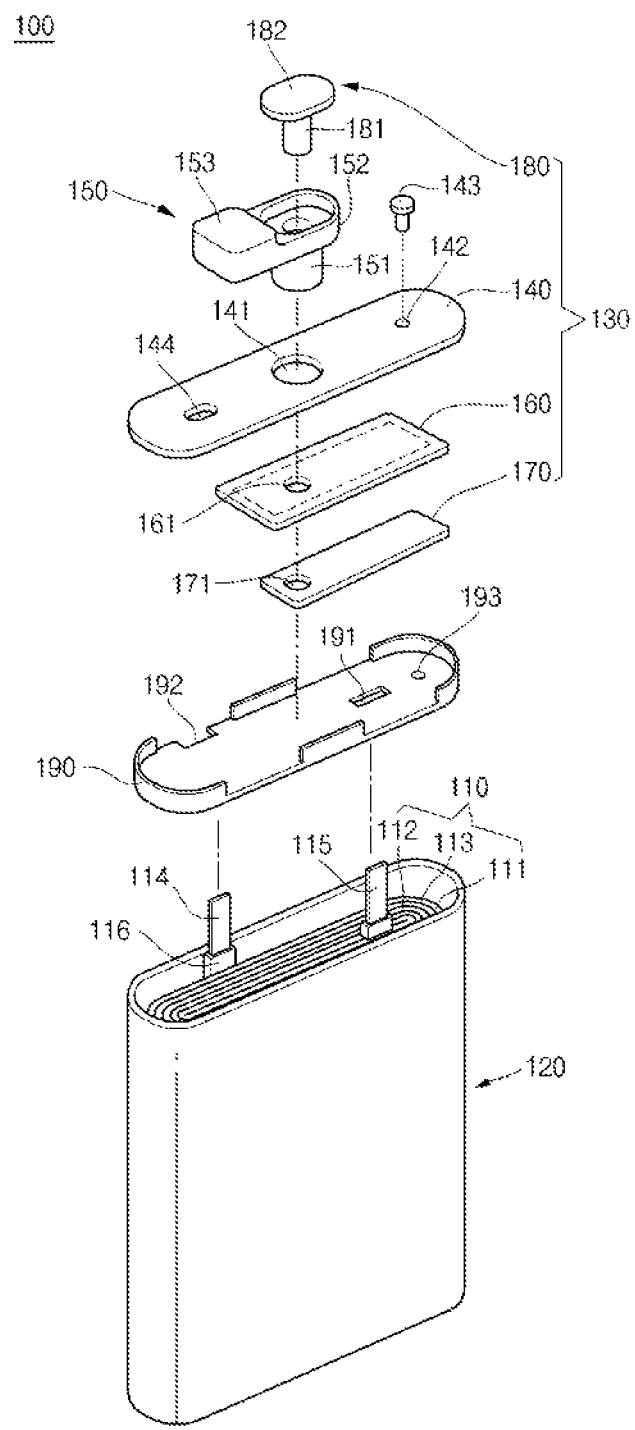
FIG. 1 is an exploded perspective view of a secondary battery according to an embodiment of the present invention.

Hereinafter, examples of embodiments of the invention will be described in detail with reference to the accompanying drawings such that they can easily be made and used by those skilled in the art. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

Figure 2:
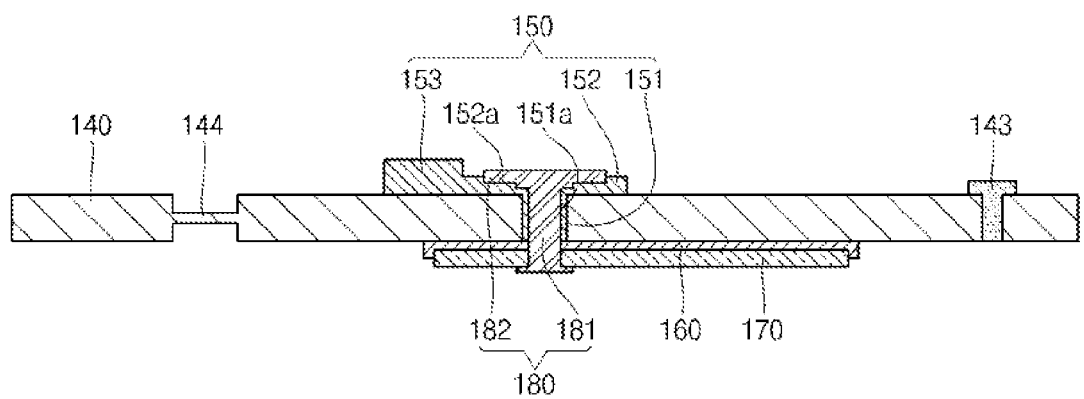
FIG. 2 is a cross-sectional view illustrating a cap assembly in the secondary battery shown in FIG. 1.
Figure 3:
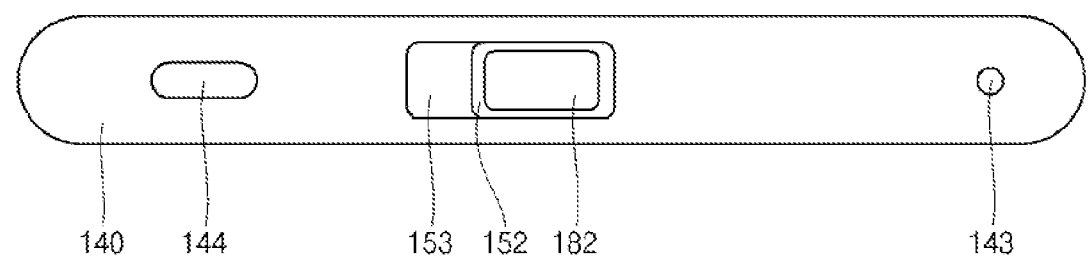
FIG. 3 is a top plan view of the cap assembly in the secondary battery shown in FIG. 1.
Figure 4:
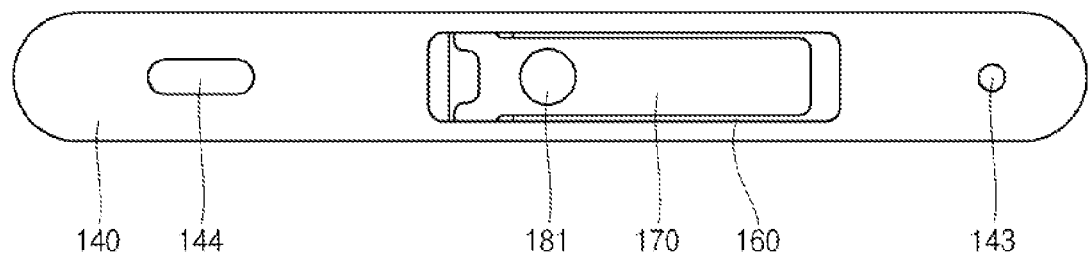
FIG. 4 is a bottom plan view of the cap assembly in the secondary battery shown in FIG. 1.
Figure 5:
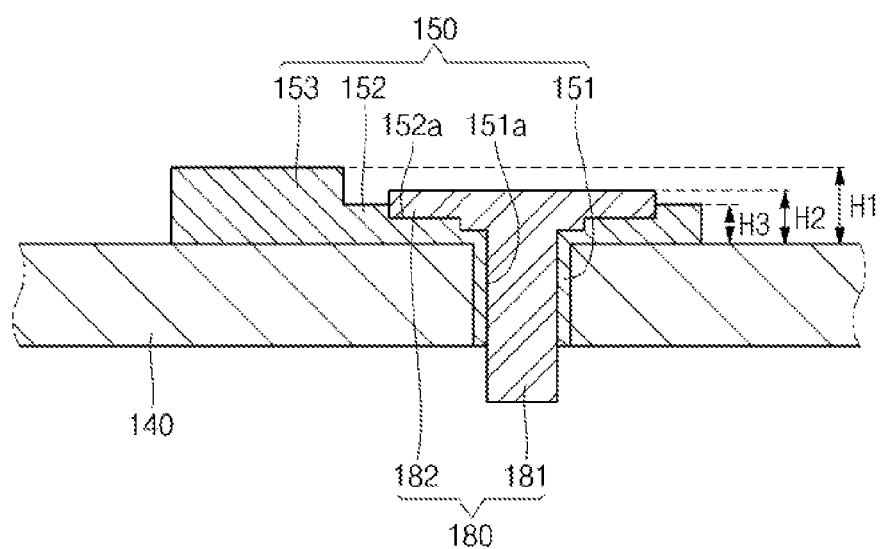
FIG. 5 is an enlarged cross-sectional view illustrating a gasket and an electrode terminal in the cap assembly according to an embodiment of the present invention.

FIG. 1 is an exploded perspective view of a secondary battery according to an embodiment of the present invention, FIG. 2 is a cross-sectional view illustrating a cap assembly in the secondary battery shown in FIG. 1, FIG. 3 is a top plan view of the cap assembly in the secondary battery shown in FIG. 1, FIG. 4 is a bottom plan view of the cap assembly in the secondary battery shown in FIG. 1, and FIG. 5 is an enlarged cross-sectional view illustrating a gasket and an electrode terminal in the cap assembly according to an embodiment of the present invention.

Referring to FIGS. 1 to 5, the secondary battery 100 according to an embodiment of the present invention includes an electrode assembly 110, a case 120, a cap assembly 130 and an insulating case 190.

The electrode assembly 110 includes a positive electrode plate 111, a negative electrode plate 112, and a separator 113 interposed between the positive electrode plate 111 and the negative electrode plate 112. In addition, the electrode assembly 110 may be formed by winding the positive electrode plate 111, the negative electrode plate 112 and the separator 113 in a substantially jelly-roll type configuration.

In more detail, the electrode assembly 110 may include the positive electrode plate 111 coated with a positive electrode active material, the negative electrode plate 112 coated with a negative electrode active material, and the separator 113 positioned between the positive electrode plate 111 and the negative electrode plate 112 to inhibit a short circuit and allowing movement of lithium ions. Here, the positive electrode plate 111 may be made of an aluminum (Al) foil, the negative electrode plate 112 may be made of a copper (Cu), and the separator 113 may be made of polyethylene (PE) or polypropylene (PP), but not limited thereto. In addition, a first electrode tab 114 upwardly protruding a predetermined length may be connected to the positive electrode plate 111, and a second electrode tab 115 upwardly protruding a predetermined length may be connected to the negative electrode plate 112. The first electrode tab 114 may be made of aluminum (Al), and the second electrode tab 115 may be made of nickel (Ni), but not limited thereto. Alternatively, polarities of the first electrode tab 114 and the second electrode tab 115 may be switched according to the choice of one skilled in the art. An insulating tape 116 is wound around the first electrode tab 114 and the second electrode tab 115 to prevent an electric short circuit from occurring to a boundary that the first electrode tab 114 and the second electrode tab 115 are exposed to the outside of the electrode assembly 110.

The case 120 has a top end opening and has a substantially rectangular shape. That is to say, the case 120 has a pair of long side portions spaced apart from each other and having a relatively large area, a pair of short side portions having a smaller area than the pair of long side portions, and a bottom portion formed at bottoms of the pair of long side portions and the pair of short side portions to be perpendicular thereto.

The case 120 is formed by a deep drawing method and the long and short side portions and the bottom portion are integrally formed. Here, the case 120 may be made of one selected from the group consisting of steel, aluminum or equivalents thereof, but not limited thereto.

The electrode assembly 110 and an electrolyte (not shown) are accommodated in the case 120. During charging/discharging, the electrolyte may serve a movement medium of lithium ions generated by an electrochemical region between the positive electrode plate 111 and the negative electrode plate 112 of the secondary battery 100. The electrolyte may be a non-aqueous organic electrolyte having a lithium salt and a high-purity organic solvent mixed therein. In addition, the electrolyte may be a polymer using a high-molecule polymer.

The cap assembly 130 includes a cap plate 140, a gasket 150, an insulation plate 160, a terminal plate 170 and an electrode terminal 180. The cap assembly 130 is coupled to a separate insulating case 190 to be engaged with the top end opening of the case 120, thereby sealing the case 120.

The cap plate 140 may be a metal plate sized and shaped to correspond to the top end opening of the case 120. The first electrode tab 114 of the electrode assembly 110 having passed through the insulating case 190 may be welded to the cap plate 140. That is to say, the cap plate 140 may have the same polarity as the first electrode tab 114 of the electrode assembly 110.

A terminal throughhole 141 passing through a portion between top and bottom surfaces of the cap plate 140 is formed at the center of the cap plate 140 and a pillar part 181 of the electrode terminal 180 is inserted into the terminal throughhole 141 to then be engaged therewith.

After the cap plate 140 is assembled to the top end opening 120a of the case 120, an electrolyte injection hole 142 for injecting an electrolyte into an internal space of the case 120 may further be provided at one side of the cap plate 140. In addition, the electrolyte injection hole 142 is sealed by a plug 143 after the electrolyte is injected into the case 120.

A safety vent 144 formed to be thinner than the other part of the cap plate 140 is formed at the other side of the cap plate 140. When an internal pressure of the secondary battery 100 exceeds a predetermined reference pressure due to an overcharge, etc., the safety vent 144 is ruptured earlier than the other part to operate to secure stability of the secondary battery 100 by releasing internal gases.

The gasket 150 is mounted on an inner surface of the terminal throughhole 141 between the cap plate 140 and the electrode terminal 180. The gasket 150 includes an insertion unit 151 inserted into the terminal throughhole 141, a mounting unit 152 placed on the top surface of the cap plate 140 from an upper portion of the insertion unit 151, and a support unit 153 formed at one side of the mounting unit 152 and upwardly protruding to be higher than the mounting unit 152.

The insertion unit 151 may have an outer diameter sized to correspond to that of the terminal throughhole 141. The insertion unit 151 includes a terminal throughhole 151a through which the pillar part 181 of the electrode terminal 180 passes. The insertion unit 151 makes close contact with a portion between the pillar part 181 and the terminal throughhole 141, thereby electrically, separating the electrode terminal 180 and the cap plate 140 from each other.

The mounting unit 152 extends along the top surface of the cap plate 140 on the insertion unit 151. The mounting unit 152 is inserted between the top surface of the cap plate 140 and a head part 182 of the electrode terminal 180 and electrically insulates the cap plate 140 and the electrode terminal 180 from each other. Here, the mounting unit 152 includes a mounting groove 152a in which the head part 182 of the electrode terminal 180 is mounted. Meanwhile, the head part 182 is formed to be thicker than a depth of the mounting groove 152a. That is to say, the head part 182 upwardly protrudes from the mounting unit 152.

The support unit 153 has a greater thickness than the mounting unit 152 at one side of the mounting unit 152 and extends along the top surface of the cap plate 140. In view of a region parallel with the long side of the cap plate 140, the support unit 153 preferably has a length of 0.5 times greater than a length of the mounting unit 152. More preferably, the support unit 153 has a length of 0.5 to 2 times a length of the mounting unit 152. If the length of the support unit 153 is less than 0.5 times the length of the mounting unit 152, the effect of the support unit 153 supporting the protective circuit board is negligible, which is undesirable.

A height of the support unit 153 supporting from a top portion of the cap plate 140 is greater than heights of the head part 182 and the mounting unit 152. In particular, referring to FIG. 5, a height H1 of the support unit 153 protruding from the top portion of the cap plate 140 is greater than a height H2 of the head part 182 protruding from the top portion of the cap plate 140. In addition, the height H2 of the head part 182 protruding from the top portion of the cap plate 140 is greater than a height H3 of the mounting unit 152 protruding from the top portion of the cap plate 140. The support unit 153 protrudes to the top portion of the cap plate 140 to be higher than the electrode terminal 180, thereby supporting a protective circuit board to be later coupled to the top portion of the cap plate 140. Therefore, even when a shock is applied to the secondary battery 100, collision between the protective circuit board and the electrode terminal 180 can be avoided or at least inhibited by the support unit 153.

In particular, the height H2 of the head part 182 protruding from the top portion of the cap plate 140 is preferably 1 to 1.5 times the height H3 of the mounting unit 152 protruding from the top portion of the cap plate 140. In addition, the height H1 of the support unit 153 protruding from the top portion of the cap plate 140 is preferably 1.5 to 3 times the height H3 of the mounting unit 152 protruding from the top portion of the cap plate 140. If the height H1 of the support unit 153 protruding from the top portion of the cap plate 140 is 1.5 times less than the height H3 of the mounting unit 152 protruding from the top portion of the cap plate 140, the effect of the support unit 153 supporting the protective circuit board and the effect of preventing the head part 182 and the protective circuit board from colliding with each other may be negligible. In addition, if the height H1 of the support unit 153 protruding from the top portion of the cap plate 140 is 3 times greater than the height H3 of the mounting unit 152 protruding from the top portion of the cap plate 140, an unnecessary space between the secondary battery 100 and the protective circuit board may increase, which is undesirable.

The insulation plate 160 is made of an insulating material and is interposed between the cap plate 140 and the terminal plate 170 to electrically disconnect the cap plate 140 and the terminal plate 170 from each other. The insulation plate 160 includes a terminal throughhole 161 located to corresponding to the terminal throughhole 141 of the cap plate 140 to allow the electrode terminal 180 to be inserted thereinto. The insulation plate 160 is coupled to the electrode terminal 180 by inserting the pillar part 181 of the electrode terminal 180 into the terminal throughhole 161. That is to say, the terminal throughhole 161 may be sized to correspond to an outer diameter of the pillar part 181.

The terminal plate 170 may be a metal plate having a top surface making close contact with a bottom surface of the insulation plate 160. A bottom surface of the terminal plate 170 faces a top surface of the insulating case 190. That is to say, the terminal plate 170 is interposed between the insulation plate 160 and the insulating case 190. The terminal plate 170 preferably has a smaller size than the insulation plate 160. The terminal plate 170 is electrically disconnected from the cap plate 140 by the insulation plate 160. The terminal plate 170 may have a bottom surface welded to the second electrode tab 115 of the electrode assembly 110 having passed through the insulating case 190, so that it has the same polarity with the second electrode tab 115 of the electrode assembly 110.

The terminal plate 170 includes a terminal throughhole 171 located to correspond to the terminal throughhole 141 of the cap plate 140 to allow the electrode terminal 180 to be inserted thereinto. The terminal plate 170 is coupled to the electrode terminal 180 such that the pillar part 181 of the electrode terminal 180 is inserted into the terminal throughhole 171. That is to say, the terminal throughhole 171 may be sized to corresponding to the outer diameter of the pillar part 181.

The electrode terminal 180 includes the pillar part 181 and the head part 182. The pillar part 181 is inserted to pass through the cap plate 140, the gasket 150, the insulation plate 160 and the terminal throughholes 141, 151a, 161 and 171 of the terminal plate 170. In addition, the head part 182 is mounted in the mounting groove 152a of the mounting unit 152 in the gasket 150. Here, the head part 182 may protrude to the top portion of the mounting unit 152. A lead plate or a secondary protective element to be connected to a protective circuit board, which will later be described, may be connected to the head part 182. Therefore, in order to facilitate the connection between the head part 182 and the lead plate or the secondary protective element, the head part 182 preferably protrude from the mounting unit 152.

The electrode terminal 180 is electrically connected to the second electrode tab 115 of the electrode assembly 110 through the terminal plate 170. When the electrode terminal 180 is inserted into the terminal throughhole 141 of the cap plate 140, it is electrically insulated from the cap plate 140 by the gasket 150. Meanwhile, the first electrode tab 114 may be connected to the electrode terminal 180 according to the process of forming the electrode assembly 110. The electrode terminal 180 is generally formed as a negative electrode terminal. However, the electrode terminal 180 may also be formed as a positive electrode terminal according to the configuration of secondary battery to be fabricated.

The insulating case 190 is made of an insulating material and is interposed between the cap assembly 130 and the electrode assembly 110 to electrically insulate the cap assembly 130 and the electrode assembly 110 from each other. In addition, the insulating case 190 includes tab holes 191 and 192 for making the first electrode tab 114 and the second electrode tab 115 of the cap assembly 130 to upwardly protrude. That is to say, the insulating case 190 electrically insulate a top end of the electrode assembly 110, from which the first electrode tab 114 and the second electrode tab 115 of the electrode assembly 110 are drawn, and the cap assembly 130 from each other.

Figure 6:
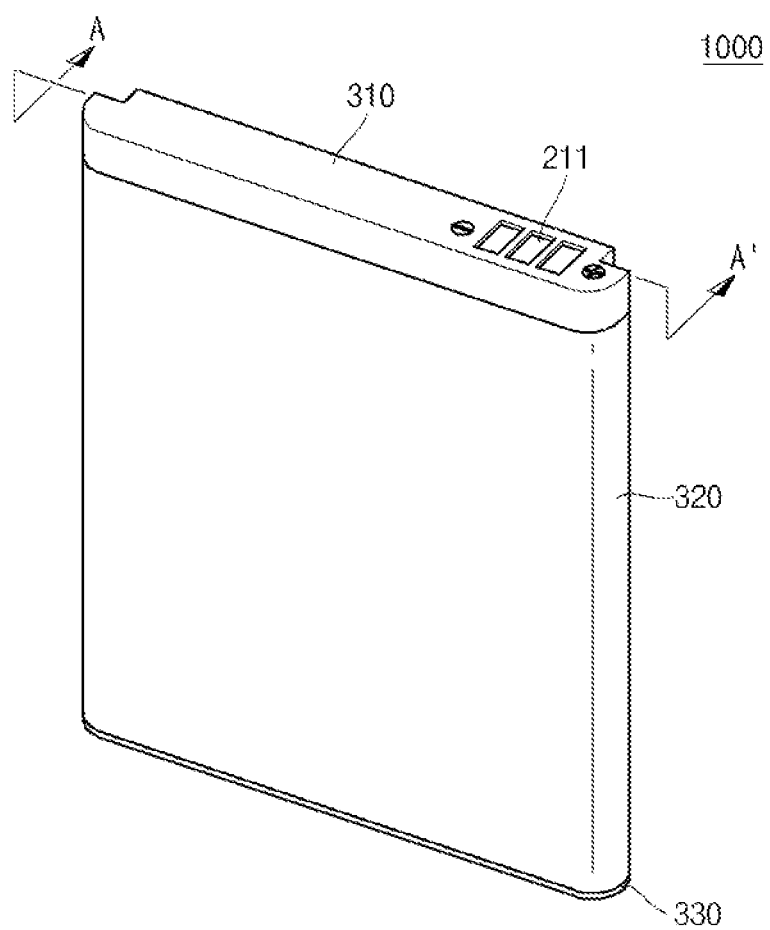
FIG. 6 is a perspective view of a battery pack including a secondary battery according to an embodiment of the present invention.
Figure 7:
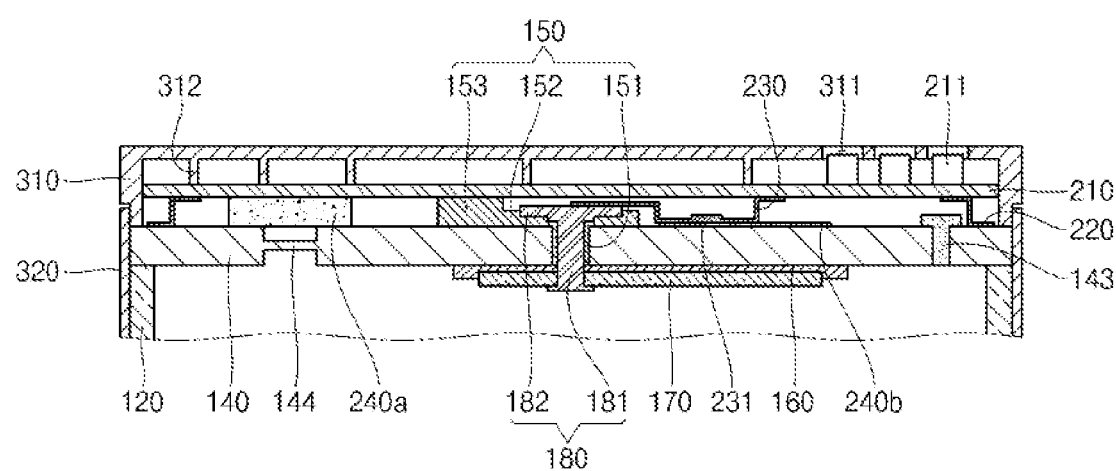
FIG. 7 is a top cross-sectional view taken along the line A-A' of FIG. 6.

FIG. 6 is a perspective view of a battery pack including a secondary battery according to an embodiment of the present invention, and FIG. 7 is a top cross-sectional view taken along the line A-A' of FIG. 6.

Referring to FIGS. 6 and 7, the battery pack 1000 including a secondary battery according to an embodiment of the present invention may include a secondary battery (not shown), a protective circuit board 210, an upper cover 310, a label 320 and a lower cover 330. Since the secondary battery is substantially the same as the aforementioned secondary battery, a repeated description thereof will not be given.

The protective circuit board 210 is mounted on a cap plate 140 of the secondary battery. In particular, the center of a bottom surface of the protective circuit board 210 makes close contact with a top surface of a support unit 153 of a gasket 150. Therefore, the center of the protective circuit board 210 may be supported by the support unit 153. Meanwhile, the support unit 153 may be formed only one side of a mounting unit 152 to form a second lead plate 230 and a secondary protective element 231, which will later be described. In some case, the support unit 153 may be formed on the mounting unit 152 in part or in whole.

Here, since the support unit 153 upwardly protrudes from the cap plate 140 to be higher than a head part 182 of an electrode terminal 180, the electrode terminal 180 and the protective circuit board 210 are spaced apart from each other. That is to say, the protective circuit board 210 may be positioned to be spaced apart from the electrode terminal 180 by the support unit 153. Therefore, even if the protective circuit board 210 is distorted due to external shocks applied during falling of the battery pack 1000, it is possible to prevent or inhibit the protective circuit board 210 from colliding with the electrode terminal 180 by the support unit 153. Even if external shocks are applied to the battery pack 1000, collision between the protective circuit board 210 and the electrode terminal 180 can be avoided, thereby preventing the electrode terminal 180 from being distorted or damaged.

The protective circuit board 210 is formed by mounting a plurality of electric elements (not shown) on a printed circuit board (PCB) having wire patterns formed thereon, and controls the overall operation of the secondary battery, including charging/discharging. The protective circuit board 210 includes an external terminal 211 formed thereon to be electrically connected to an external device (not shown).

The protective circuit board 210 is connected to the cap plate 140 and the electrode terminal 180 of the secondary battery by first and second lead plates 220 and 230 to then be electrically connected to positive and negative electrodes of an electrode assembly.

The first lead plates 220 are formed on opposite ends of a bottom surface of the protective circuit board 210 to then be connected to the cap plate 140. That is to say, one side of each of the first lead plates 220 is connected to the bottom surface of the protective circuit board 210 and the other side is bent to be connected to a top surface of the cap plate 140.

The second lead plate 230 electrically connects the electrode terminal 180 and the protective circuit board 210 of the secondary battery. That is to say, one side of the second lead plate 230 is connected to the bottom surface of the protective circuit board 210 and the other side is connected to the head part 182 of the electrode terminal 180. Meanwhile, a secondary protective element 231 may be connected to the second lead plate 230. The secondary protective element 231 is mounted on the top surface of the cap plate 140 to then be connected between the electrode terminal 180 and the protective circuit board 210. A PTC element, a bi-metal or a thermal fuse may be used as the secondary protective element 231. When an internal temperature excessively rises or an excessive amount of current flows in the battery pack 1000, an electrical connection between the protective circuit board 210 and the electrode terminal 180 may be cut off.

A first adhesive sponge 240a may be formed at one side of a portion between the cap plate 140 and the protective circuit board 210. The first adhesive sponge 240a is interposed and adhered between the cap plate 140 and the protective circuit board 210, thereby supporting the cap plate 140 and the protective circuit board 210. In addition, when an external shock is applied to the battery pack 1000, the first adhesive sponge 240a may absorb at least some of the external shock and may electrically disconnect the cap plate 140 and the protective circuit board 210 from each other. Meanwhile, a second adhesive sponge 240b is interposed between the secondary protective element 231 and the cap plate 140. The second adhesive sponge 240b electrically insulating the cap plate 140, the secondary protective element 231 and the second lead plate 230 from one another while fixing the secondary protective element 231 on the top surface of the cap plate 140.

The upper cover 310 is coupled to a top portion of a secondary battery (not shown) and accommodates the protective circuit board 210 in its internal space.

The upper cover 310 may have substantially the shape as a top surface of the secondary battery. A terminal hole 311 is formed at one side of the upper cover 310. The external terminal 211 of the protective circuit board 210 is exposed to the outside by the terminal hole 311 to then be electrically connected to an external electric device. The upper cover 310 may further include a plurality of ribs 312. The ribs 312 support the top surface of the protective circuit board 210, thereby tightly fastening the protective circuit board 210 with the top surface of the secondary battery.

The label 320 is attached to surround sidewalls of the secondary battery (not shown). The label 320 may be formed to cover portions of the upper cover 310 and the lower cover 330, which will later be described.

The lower cover 330 may be coupled to a bottom portion of the secondary battery (not shown). The lower cover 330 may have substantially the shape as a bottom surface of the secondary battery and may be attached to the bottom surface of the secondary battery by an adhesive member (not shown).

As described above, the secondary battery according to an embodiment of the present invention includes a support unit at one side of a gasket to protrude to a top portion of a cap plate to be higher than an electrode terminal. In addition, the support unit comes into contact with a protective circuit board mounted on the cap plate. Therefore, since the protective circuit board is supported by the support unit, the protective circuit board and the electrode terminal are positioned to be spaced apart from each other. In addition, even if an external shock is applied to the secondary battery, collision between the protective circuit board and the electrode terminal can be avoided.

While the secondary battery according to the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A secondary battery comprising:
an electrode assembly;
a case accommodating the electrode assembly;
a cap plate coupled to an opening of the case;
an electrode terminal electrically connected to the electrode assembly and upwardly protruding through a terminal throughhole of the cap plate; and
a gasket interposed between the cap plate and the electrode terminal and electrically insulating the cap plate and the electrode terminal from each other,
wherein the gasket includes a support unit protruding from the cap plate to be higher than the electrode terminal and a mounting unit that extends along a top surface of the cap plate wherein the electrode terminal extends higher from the cap plate than the mounting unit and the support unit extends upward higher from the cap plate than the electrode terminal.

2. The secondary battery of claim 1, wherein the gasket comprises:
an insertion unit inserted into the terminal throughhole; and
the mounting unit extending on the insertion unit along a top surface of the cap plate and including a mounting groove in which the electrode terminal is mounted.

3. The secondary battery of claim 2, wherein the support unit extends from a region of the mounting unit along the top surface of the cap plate.

4. The secondary battery of claim 2, wherein the support unit has a thickness of 1.5 to 3 times a thickness of the mounting unit.

5. The secondary battery of claim 2, wherein the electrode terminal includes a pillar part inserted into the terminal throughhole and a head part mounted in the mounting unit.

6. The secondary battery of claim 5, wherein the head part protrudes from the top surface of the cap plate to be higher than the mounting unit.

7. The secondary battery of claim 1, further comprising a protective circuit board mounted on the cap plate, wherein a bottom surface of the protective circuit board comes into contact with a top surface of the support unit.

8. The secondary battery of claim 7, wherein the protective circuit board and the electrode terminal are spaced apart from each other.

9. A secondary battery comprising:
an electrode assembly;
a case having an opening that receives the electrode assembly;
a cap plate having a terminal through hole coupled to the opening of the case;
an electrode terminal electrically connected to the electrode assembly and upwardly protruding through the terminal through hole of the cap plate;
a gasket interposed between the cap plate and the electrode terminal wherein the gasket electrically insulates the cap plate and the electrode terminal from each other and wherein the gasket includes a support unit protruding from an upper surface of the cap plate and a mounting unit that extends along a top surface of the cap plate wherein the electrode terminal extends higher from the cap plate than the mounting unit and the support unit extends upward higher from the cap plate than the electrode terminal;
a protective circuit board position over the upper surface of the cap plate wherein the protective circuit board is mounted on the support unit and wherein the support unit is sized to space the protective circuit board from the electrode terminal.

10. The secondary battery of claim 9 wherein the gasket protrudes further from the upper surface than the electrode terminal.

11. The secondary battery of claim 9, wherein the gasket comprises:
an insertion unit inserted into the terminal through hole; and
the mounting unit extending on the insertion unit along a top surface of the cap plate and including a mounting groove in which the electrode terminal is mounted.

12. The secondary battery of claim 11, wherein the support unit extends from a region of the mounting unit along the top surface of the cap plate.

13. The secondary battery of claim 11, wherein the support unit has a thickness of 1.5 to 3 times a thickness of the mounting unit.

14. The secondary battery of claim 11, wherein the electrode terminal includes a pillar part inserted into the terminal throughhole and a head part mounted in the mounting unit.

15. The secondary battery of claim 14, wherein the head part protrudes from the top surface of the cap plate to be higher than the mounting unit.

* * * * *